United States Patent
Boden et al.

(10) Patent No.: US 9,525,760 B1
(45) Date of Patent: Dec. 20, 2016

(54) DYNAMIC PROCESSING CONTEXT

(71) Applicant: MARVELL INTERNATIONAL LTD., Hamilton (BM)

(72) Inventors: Kurt Thomas Boden, Strangnas (SE); Gunnar Nordmark, Stockholm (SE); Mikael Karpberg, Stockholm (SE)

(73) Assignee: MARVELL INTERNATIONAL LTD., Hamilton (BM)

( * ) Notice: Subject to any disclaimer, the term of this patent is extended or adjusted under 35 U.S.C. 154(b) by 113 days.

(21) Appl. No.: 14/505,110

(22) Filed: Oct. 2, 2014

Related U.S. Application Data (60) Provisional application No. 61/885,736, filed on Oct. 2, 2013.

(51) Int. Cl.
*H04L 29/06* (2006.01)

(52) U.S. Cl.
CPC ............ *H04L 69/22* (2013.01); *H04L 69/161* (2013.01)

(58) Field of Classification Search
CPC .. H04L 49/103; H04L 49/3036; H04L 49/102; H04L 69/22; H04L 69/161; Y02B 60/1207; Y02B 60/1225
See application file for complete search history.

(56) References Cited

U.S. PATENT DOCUMENTS 7,661,100 B2   2/2010  Gerell et al.
8,072,974 B1*  12/2011 Jain et al. ................. 370/389
9,104,478 B2*  8/2015  Boland et al.

* cited by examiner

*Primary Examiner* — Ayaz Sheikh
*Assistant Examiner* — Debebe Asefa (57) ABSTRACT

A network processing device comprising a plurality of programmable processors coupled together to perform a set of packet processing operations to process a packet received by the network processing device. Ones of the programmable processors being configured to perform a respective subset of the set of packet processing operations with a respective portion of a packet context such that respective programmable processors receives a portion of the packet context, that is less than a full packet context for performing the packet processing operations. The portion of a packet context being dimensioned to perform the respective subset of the packet processing operations.

20 Claims, 6 Drawing Sheets

DYNAMIC PROCESSING CONTEXT

CROSS-REFERENCE TO RELATED APPLICATION

This application claims priority to and the benefit of U.S. Provisional Patent Application No. 61/885,736 filed Oct. 2, 2013 the disclosure of which is incorporated by reference herein in its entirety.

BACKGROUND

The present disclosure relates to a network device that processes packets.

The background description provided herein is for the purpose of generally presenting the context of the disclosure. Work of the presently named inventors, to the extent it is described in the background section, as well as aspects of the description that may not otherwise qualify as prior art at the time of filing, are neither expressly nor impliedly admitted as prior art against the present disclosure.

As part of packet processing operations, various network processors include multiple processing engines that each perform at least a part of a set of processing operations that need to be performed to process a packet received from a network. In general, packet contexts are used by the processing engines to ensure that a respective processing engine performs a next processing operation in a processing flow. Packet contexts include, for example, data such as a packet header, variables for processing the packet, a state of processing of the packet and other information about the packet being processed. Packet contexts typically accompany packets as they are passed to different processing stages in the network processor, and hold packet-specific data.

SUMMARY

Providing a full packet context for each processor when the full packet context is not needed, however, has its own costs. Such costs include the expenditure of memory resources to store the parts of the full packet context not needed by a given processor, and the cost of processor resources expended in placing the full packet context there. Therefore, according to example embodiments, the portion of the packet context that is needed at a particular processor is extracted and provided to the processor, and the result after processing is merged back into the full packet context.

One or more example embodiments relate to a network processor having, in particular, a pipeline architecture. The specific pipeline architecture described in detail includes a pipeline of packet processor stages for performing packet processing operations. Each of the packet processing stages of the network device processes a portion of a full packet context (herein, a "full packet context" includes all of the packet header, the variable memory, and information about the state of packet processing, while a "portion" refers to less than the full packet context).

An upstream processor stage selects a portion of the full packet context, which is less than the full packet context, subsequently performs processing operations for the selected portion of the packet context and passes the result of processing to a downstream stage.

The full packet context is stored in memory while the upstream stage performs the processing operations for the selected portion of the packet context. The downstream processing stage merges the result of the processing from the upstream stage with the full packet context from the memory.

One or more example embodiments relate to a network processor independent of any particular architecture, namely, network processors that are not arranged with a pipeline architecture.

DETAILED DESCRIPTION

In the following discussion, descriptions of well-known functions and constructions are omitted for increased clarity and conciseness.

For the sake of explanation, this detailed discussion is presented first in the context of a network processor having a pipeline architecture. This is simply an example embodiment. A pipeline architecture is not necessarily required for the implementation of the inventive concept, which might be implemented, for example, in a network processor or other suitable packet processor that includes a non-pipelined multiplicity of programmable processors that respectively are configured to perform only a portion of processing operations on a packet to be processed and to selectively pass partially processed packets to other programmable processors for additional processing.

Figure 1:
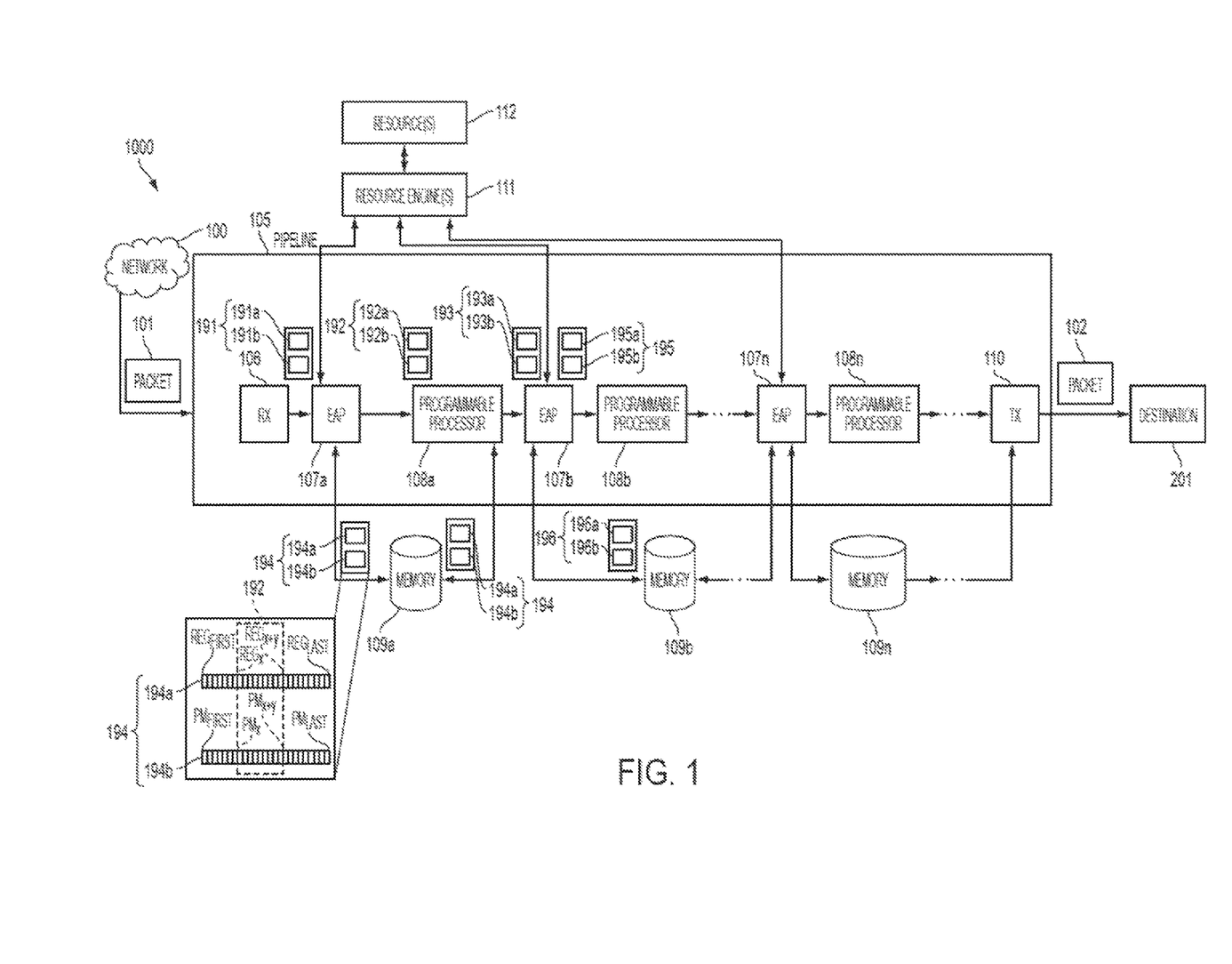
FIG. 1 shows a pipeline of processing stages of a network device according to example embodiments.
Figure 6:
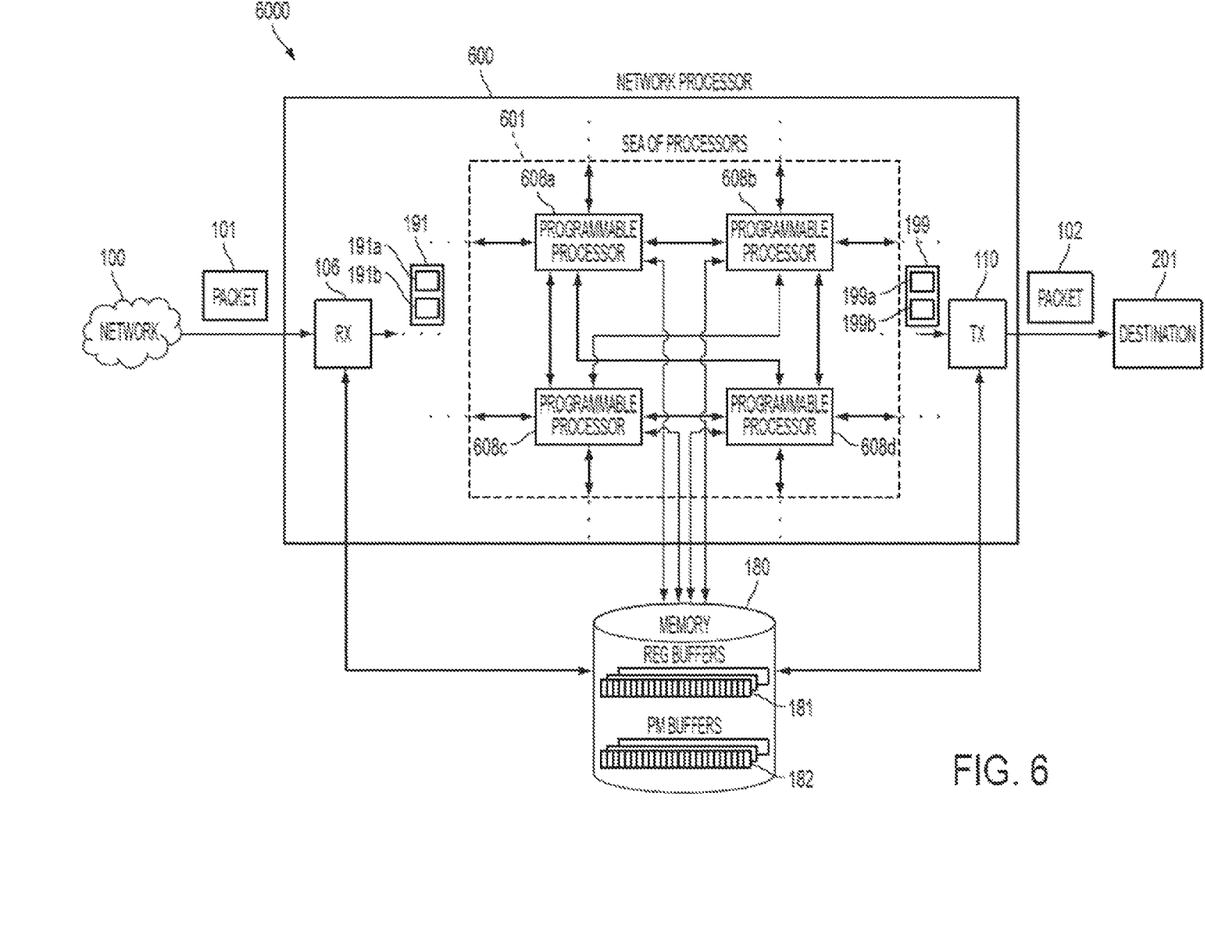
FIG. 6 shows processing stages of a network device according to example embodiments.

FIG. 1 shows a system 1000 including network 100, packet 101, a processing system, and destination 201. The destination 201 is a forwarding location to which the packet 101 is forwarded by the pipeline 105. According to an example embodiment, the system is arranged as a pipeline 105; however, other packet processing architectures, such as that of FIG. 6, are also compatible with the disclosure herein.

In the embodiment seen in FIG. 1, pipeline 105 includes an ingress port 106 (labeled "RX" for receiver or the like) and an egress port 110 (labeled "TX" for transmitter or the like) as well as a plurality of sets of engine access points (EAP 107a, EAP 107b, EAP 107n) and software driven programmable processors 108a, 108b, and 108n.

The pipeline 105 is configured to process a packet 101 with respect to a packet context traveling through the pipeline 105 with the packet 101. According to an example embodiment, only a portion of a packet context that is to be processed by a programmable processor or a set of programmable processors is transmitted to the programmable processor or set of programmable processors. The portion of the packet context is less than the full packet context. While the portion of the packet context is being processed, the full packet context or at least the remaining portions of the full packet context are stored in a memory.

Since only a portion of the context is processed by the processing stages, both processing and power requirements are reduced as compared to an example in which a full context is passed among the processing stages.

FIG. 1 illustrates a full context 194 including a full REG context 194a and a full PM context 194b; detailed descriptions of these components are discussed in greater detail below. FIG. 1 also illustrates a portion 192 of the full context 194, and according to example embodiments, the portion 192 is processed while the full context 194 is stored. The processed portion 193 is merged with the full context 194 to combine the results of the processing with the remaining context.

According to an example embodiment, the programmable processing stages include software driven programmable processors (processor 108a, processor 108b, processor 108n).

According to an example embodiment, the programmable processors are sets of Packet Instruction Set Computer (PISC) stages arranged in a pipeline, for example as described in greater detail U.S. Pat. No. 7,661,100 which is incorporated herein in its entirety; however, the use of PISC stages is merely an example embodiment of a packet processor and other suitable programmable processors, such as systems on a chip processors and a sea of processors as in FIG. 6, are also compatible with the disclosure herein.

According to example embodiments, PISC architecture is a type of synchronous dataflow architecture which executes word instructions, such as very long word instructions. Each instruction word has four fields corresponding to different classes of operations, in an embodiment, such as arithmetic logic unit operations, copy operations, branch and trap operations, and load offset operations. A PISC processor is configured to fetch instructions from local instruction memory and execute one instruction, per packet, to completion with a fixed latency, such as within a single clock cycle.

According to example embodiments, a PISC processor also prepares an operation in a succeeding processor by writing a driver number to a dedicated special-purpose register, and the driver number serves as an index in a driver table for a driver table entry which specifies a request to make and points out the locations of request and response data in a packet context. According to an example embodiment, the instructions are always available in the instruction memory, and all operands reside in the packet context. A program linker statically maps each instruction to the instruction memory of a single PISC processor and instruction boundaries mask the boundaries between processing elements.

The EAPs of pipeline 105 dynamically access resources 112 through resource engines 111 for processing by the programmable processors such as PISC processors in example embodiments and other types of programmable processors in other example embodiments. The resources 112 include values of a table (not shown) which is accessed in response to the packet 101. According to an example embodiment, the resources 112 are merged with a full context 191 of the packet 102.

The data of the full context 191 includes a full REG context 191a and a full PM context 191b. The full REG context 191a includes values of general purpose registers where variables have been prepared for look-up operations, results of look-up operations, results of analyses, or temporary variables stored by processor cores. The full REG context 191a contains hardware-specific and process-specific registers such as a source queue, a destination queue, ALU flags and instruction pointers. The full PM context 191b includes a location that indicates where a part of a packet header is stored and is to be parsed and forwarded when the packet 101 exits the network processor.

According to an example embodiment, the full PM context 191b is a first part of a header of the packet 101, and the full REG context 191a includes a pointer to the tail of the packet 101.

According to an example embodiment, the EAP 107a receives the full context 191 of the packet 101 and merges the full context 191 with resources, such as pre-compiled values for future processing of the packet 101, from the resources 112 into a merged context 194. The full context 191 instructs the EAP 107a to get the resources which are fetched and merged with the full context 191; according to example embodiments, the resources a fetched by a lookup in any of a forwarding database, a policy database, and the like. The merged context 194 includes a merged full REG context 194a and a merged full PM context 194b.

According to example embodiments, the engines called from the EAP 107a include lookups in internal SRAM, Meters, Counters, TCam and the like. According to example embodiments, the engines called from the EAP 107a include lookups in external DRAM, SRAM, NSE engines and the like.

The EAP 107a selects a portion 192 of the merged full context 194 corresponding to the packet 101, in an embodiment, provides only the portion 192 of the merged context 191 to a downstream programmable processing stage, such as PISC 108a, and stores the merged full context 194 in a corresponding memory, such as memory 109a. According to other embodiments, only the portion of the full context 194 that is not processed is stored in a memory, such as in the example embodiments of FIG. 5. Returning to FIG. 1, in an embodiment, the respective portions of the merged context that are processed by each of the programmable processors are less than the full size of the merged full context.

The selected portion 192 of the merged full context 194 includes a selected portion 192a of the merged full REG context 194a and a selected portion 192b of the merged full PM context 194b. The selected portion 192a of the merged full REG context 194a is less than the merged full REG context 194a. The selected portion 192b of the merged full PM context 194b is less than the merged full PM context 194b.

A processor stage, such as PISC 108a, processes the portion 192 of the merged-context 194, in an embodiment, and provides a result of the processing to a downstream EAP, such as EAP 107b. The processing of the merged context 194 includes a processing of the selected portion 192b of the merged full PM context with the selected portion 192a of the merged full REG context 194a.

According to an embodiment in which the packet processing architecture of the network processing system 1000 includes PISC processors, the PISC 108a transmits a result of processing the portion 192 of merged context 191 to a downstream EAP, such as EAP 107b.

The result of processing the portion 192 of merged context 194 is transmitted to the EAP 107b as processed portion 193 of merged context 194. The processed portion 193 of merged context 191 includes a processed portion 193a of the selected portion 192a of the merged full REG context 194a, and the processed portion 193 of merged context 191 includes a processed portion 193b of the selected portion 192b of the merged full PM context 194b.

EAP 107*b* receives the processed portion 193 of merged context 191 from the PISC 108*a* and also receives the merged context 191, which is a full packet context, from the memory 109*a*. The EAP 107*b* merges the processed portion 193 of merged context 191 with the merged-context 191 as merged context 196.

The EAP 107*b* selects a portion 195 of the merged context 196 traveling with the packet 101, in an embodiment, provides only the portion 195 of the merged context 196 to a downstream programmable processing stage, such as PISC 108*b*, and stores the merged context 196 in a corresponding memory, such as in memory 109*b*.

The selected portion 195 of the merged full context 196 includes a selected portion 195*a* of the merged full REG context 196*a* and a selected portion 195*b* of the merged full PM context 196*b*. The selected portion 195*a* of the merged full REG context 196*a* is less than the merged full REG context 196*a*. The selected portion 195*b* of the merged full PM context 196*b* is less than the merged full PM context 196*b*.

EAP 107*b* also selects a portion 125 of the presently merged full packet context 124, provides the selected portion 125 to a programmable processor, such as PISC 108*b*, and stores the presently merged full packet context 124 in memory 109*b*.

According to example embodiments, the above described processing continues until a full processing operation is completed, such as when a destination is determined, stripping of the headers is completed, tunnel termination is performed, security and time stamping are applied, or some other policy is applied. Further, as the PISC passes a result of processing to a downstream EAP, the PISC is capable of receiving another portion of a different packet context for processing. According to example embodiments, the pipeline 105 there are several packets in the pipeline 105, each at a different stage of processing at a given moment, such that the pipeline 105 processes the several packets in a serial manner; however, this is merely an example embodiment.

According to an example embodiment, the memories (memory 109*a*, memory 109*b*, memory 109*n*) are static random-access memory (SRAM) which store packet contexts while corresponding portions of the packet contexts are processed, and the PISC processor stages (PISC 108*a*, PISC 108*b*, PISC 108*n*) include flip-flops and other circuitry of programmable processors. Although FIG. 1 illustrates distributed memories, the memories are located on a single chip or in some other configuration according to other example embodiments.

According to example embodiments, a packet traverses through the processors with a program code, such as meta instructions that a PISC program parses and executes. The packet context includes is data specific to the packet such as a subset of bytes of a packet, register values, condition flags, and the like, used by the programmable processors to perform a processing operation on a packet according to a context. Each portion of the program code is not processed at every programmable processor, and only the portions of the program code which are processed are transmitted to a respective programmable processor to perform the processing. Example embodiments of the operations of the pipeline 105 are described according to the flowcharts of FIGS. 2A and 2B.

Figure 2A:
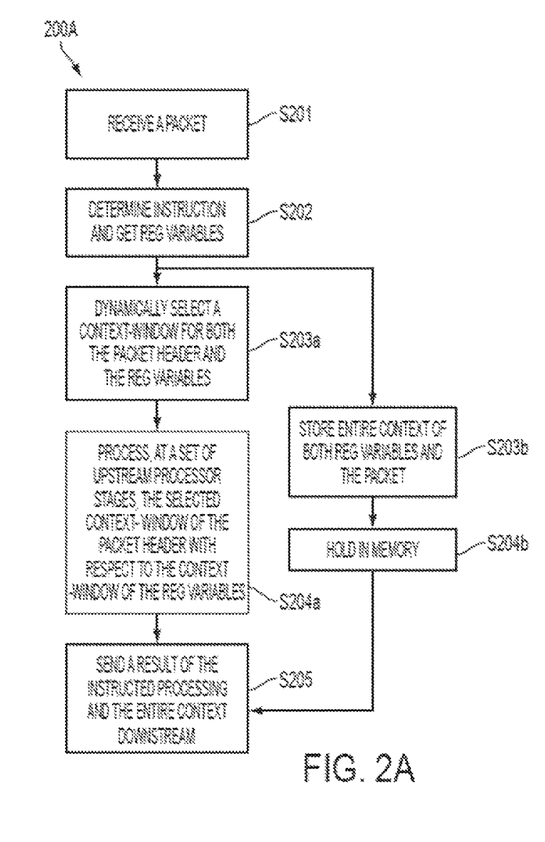
FIGS. 2A and 2B depicts flowcharts showing operation of the network processing of FIG. 1 according to example embodiments.

FIG. 2A depicts a flow diagram 200A of an example algorithm and method, according to example embodiments, for processing a data packet that is received by the network device. In particular, the example embodiment of FIG. 2A is an example of making at least a partial routing determination by a processor employing programmable processors, arranged for example in a pipeline.

The example method of FIG. 2A applies to multiple example embodiments in which the network device is utilized, for example, the system 1000 of FIG. 1. Processing begins at S201 at which the pipeline processor receives a data packet during a network session. Processing continues at S202.

At S202, an EAP of the network processor, or other suitable selection unit of a network processor arranged for example as a pipeline of programmable processor units, determines an instruction, by an instruction pointer for the received data packet, to perform a lookup to receive a set of previously compiled parameters on which REG variables are to be selected for processing the received data packet, by accessing a resource table indicating the REG variables. The EAP merges the indicated REG variables with a packet context of the data packet, and processing continues at S203*a* and S203*b* in parallel, in an embodiment.

At S203*a*, the EAP dynamically selects a window of the packet context. The window is less than the full packet context and in an embodiment includes a portion of a packet header, a variable memory, a state of processing and other information about the packet being processed. Processing continues at S204*a*.

At S204*a*, a set of processor stages receives the selected window of the packet context. The processor stages process the selected window of the packet header with respect to the selected window of variables. The processor stages do not receive any portion of the packet context besides the selected window. Processing continues at S205.

Meanwhile at S203*b*, the EAP stores the full packet context in a memory, and processing of the selected portion of the context and packet header continues at S204*b*.

At S204*b*, the memory holds or buffers the full packet context in parallel with the processing of the selected window, such as at S204*a*. Processing continues at S205.

At S205, the set of processor stages have completed processing the selected window of the packet context, and the set sends a result of the processing to a downstream EAP. The downstream EAP also receives the full packet context from the memory.

Figure 2B:
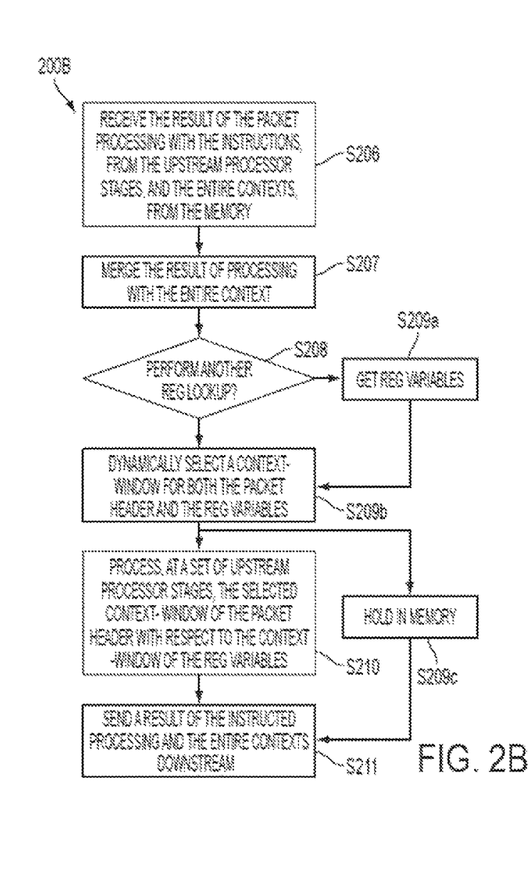

FIG. 2B is a flow diagram 200B of an example algorithm and method, according to example embodiments, when a data packet is received by the network device. In particular, the example embodiment of FIG. 2B is an example of making at least a partial routing determination by a pipeline processor.

The example method of FIG. 2B applies to multiple example embodiments in which the network device is utilized, for example, the system 1000 of FIG. 1, software driven processors, and other network devices which process a packet context. Processing begins at S206 at which a downstream EAP, relative to the EAP of S202 of FIG. 2A, receives a result of processing by an upstream set of processors stages and also receives a full packet context from a memory. Processing continues at S207.

At S207, the downstream EAP merges the result of processing with the full packet context, which has been stored in a memory by the EAP of S202 of FIG. 2A, while the upstream processor stages were producing the result of processing. The merged full packet context contains the results of processing at the preceding upstream PISC stages, a state of processing, packet memory, instructions and REG variables for processing at a set of downstream PISC stages. Processing continues at S208.

At S208, the downstream EAP determines whether or not another REG look-up should be performed, for example, if the REG variables of the full packet context are to be updated. Processing continues at S209a if another look-up is to be performed in response to instructions of the full packet context. Processing continues at S209b if there are not instructions to perform another look-up.

At S209a, the downstream EAP retrieves a set of REG variables by accessing a resource engine. The REG variables are retrieved and added to the full packet context resulting in a merged packet context including the retrieved REG variables. Processing continues at S209b.

At S209b, the downstream EAP dynamically selects a window of the merged packet context. The window is less than the full packet context and includes a portion of a packet header, a variable memory, a state of processing and other information about the packet being processed. Processing continues at S210 and S209c in parallel.

At S210, a set of processor stages receives the selected window of the merged packet context. The processor stages processes the selected window of the packet header with respect to the selected window of variables. The processor stages do not receive any portion of the merged packet context besides the selected window. Processing continues at S211.

Meanwhile at S209c, the EAP stores the full, merged packet context in a memory. The memory holds or buffers the full packet context while the PISC stages are processing the selected window, such as at S210. Processing continues at S211.

At S211, the set of processor stages has processed the selected window of the merged packet context, and the set sends a result of the processing to an EAP which is downstream to the current set of processor stages. The downstream EAP also receives the full packet context that is stored in memory.

More detailed information concerning the operations in flowcharts FIGS. 2A and 2B are described with reference to FIGS. 3 and 4.

Figure 3:
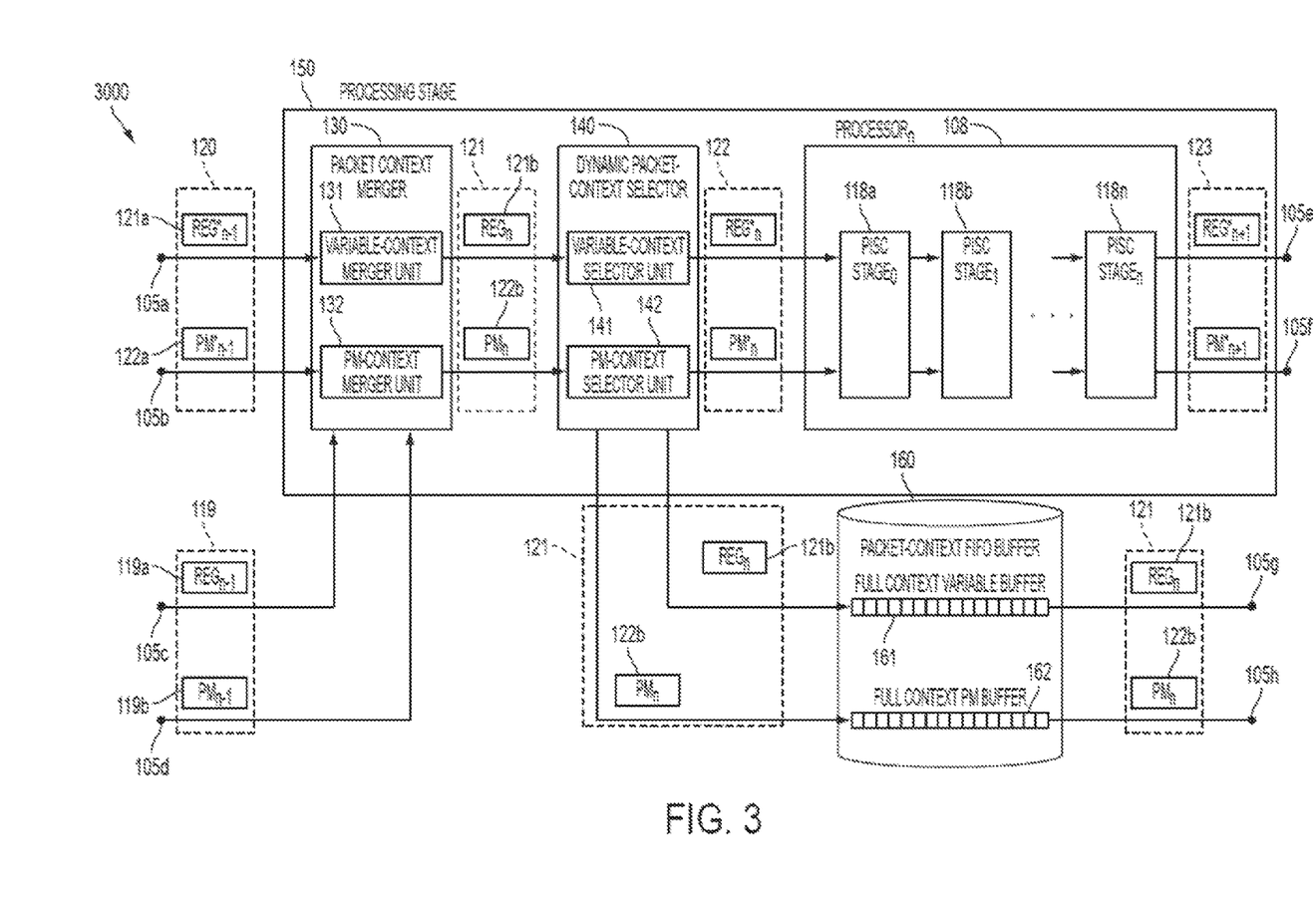
FIG. 3 shows a processing stage of the network processor of FIG. 1 according to example embodiments.

FIG. 3 shows a system 3000 including a processing stage 150, such as an EAP and Programmable Processor downstream and adjacent to the EAP, of the pipeline 105 of FIG. 1. According to example embodiments, the EAPs of FIG. 1 respectively include the packet context merger unit 130 and dynamic packet context selector 140 of FIG. 3, and the packet-context merger 130 and dynamic packet-context selector 140 are separate units according to example embodiments. The programmable processors of FIG. 1 each respectively include the processing stages 108, which include PISC stage 118a, PISC stage 118b, and PISC stage 118n; however, this is merely an example embodiment, and the programmable processors include other software driven stages for processing a packet context.

According to example embodiments, the EAPs of FIG. 1 include at least two functionalities, merge and select. The merge functionalities of an EAP retrieves a result of processing from an upstream processor and other REG variables, as discussed above, and a full context from a buffer and merges these values together to update the full context for further processing. The select functionalities of an EAP selects a portion of the full context that is to be processed at a next processor, and the select functionalities also select portions of the full context that are not to be processed at a next processor and cause these portions to be stored in a buffer.

According to an example embodiment, the processing stage 150 includes EAP 107a and processor 108a of FIG. 1. The processing stage 150 is in communication with other portions of the pipeline 105, which refers to the pipeline of FIG. 1, via communication lines (line 105a, line 105b, line 105c, line 105d, line 105e, line 105f, line 105g, and line 105h).

Line 105a and line 105b connect the processing stage 150 to the processors of an upstream processing stage (not shown) and respectively transmit a partial REG context 121a and partial PM context 122a to the packet context merger unit 130. According to example embodiments partial REG context 121a and partial PM context 122a are each 128 bytes, respectively.

Partial REG context 121a and partial PM context 122a are included in a partial-context 120 which includes a result of processing at the upstream processing stage.

Line 105c and line 105d connect the processing stage 150 to a memory (not shown), used by the upstream processing stage to store a full packet context, and respectively transmit full REG context 119a and full PM context 119b to the packet context merger unit 130.

Full REG context 119a and full PM context 119b are included in the full-context 119 which also includes the full packet context corresponding to the partial-context 120.

The packet context merger unit 130 includes variable-context merger unit 131 and PM context merger unit 132 which receive both the full-context 119 and partial-context 120.

Variable-context merger unit 131 merges the partial REG context 121a of partial-context 120 with the full REG context 119a of full-context 119. This merger results in merged REG context 121b.

PM context merger unit 132 merges partial PM context 122a of partial-context 120 with full PM context 119b of full-context 119. This merger results in merged PM context 122b.

The packet context merger unit 130 transmits a merged context 121 to the dynamic packet context selector 140. The merged context 121 includes the merged REG context 121b and the merged PM context 122b.

The dynamic packet context selector 140 receives the merged context 121 and selects a portion 122 of merged context 121, to be processed, which is less that the full portion of the merged context 121. The variable-context selector selects a portion of the merged REG context 121b, based on an instruction pointer pointing to a table containing precompiled parameters on which REG to select to be accessible to the processor 108, and the PM context selector 142 selects a portion of the merged PM context 122b.

The dynamic packet context selector 140 also transmits the full merged context 121, including both merged REG context 121b and merged PM context 122b, to the packet context FIFO buffer 160.

The packet context first in first out (FIFO) buffer 160 includes a full-context variable buffer 161 and a full-context PM buffer 162 which respectively store merged REG context 121b and merged PM context 122b. The packet context FIFO buffer 160 stores the merged REG context 121b and merged PM context 122b while the PISC processor stages 118a-118n of processor 108 process the selected portion 122 of merged context 121.

According to example embodiments, the processing stages 108 only receive the portion 122 of merged context 121 which is less than the merged context 121, and therefore reduce power demands and processor resources of the processor stages 108 because these stages handle only a portion of the merged context 121 which is less than the full merged context 121. As only the portion 122 is processed, in this example embodiment, by storing only a portion of and not the full packet context, both the processing and power demands are reduced as compared to an example wherein a full context is passed to the processing stages.

The PISC processing stages 118 of processor 108 transmit the processed portion 123 of merged context 121 to a downstream processing stage (not shown) along line 105e and line 105f. The line 105e transmits the processed context and the line 105f transmits the processed packet flow.

The downstream processing stage also receives the merged context 121 from the packet context FIFO buffer 160 along line 105g and line 105h.

A more detailed description of the window of the packet context is discussed with reference to FIG. 4.

Figure 4:
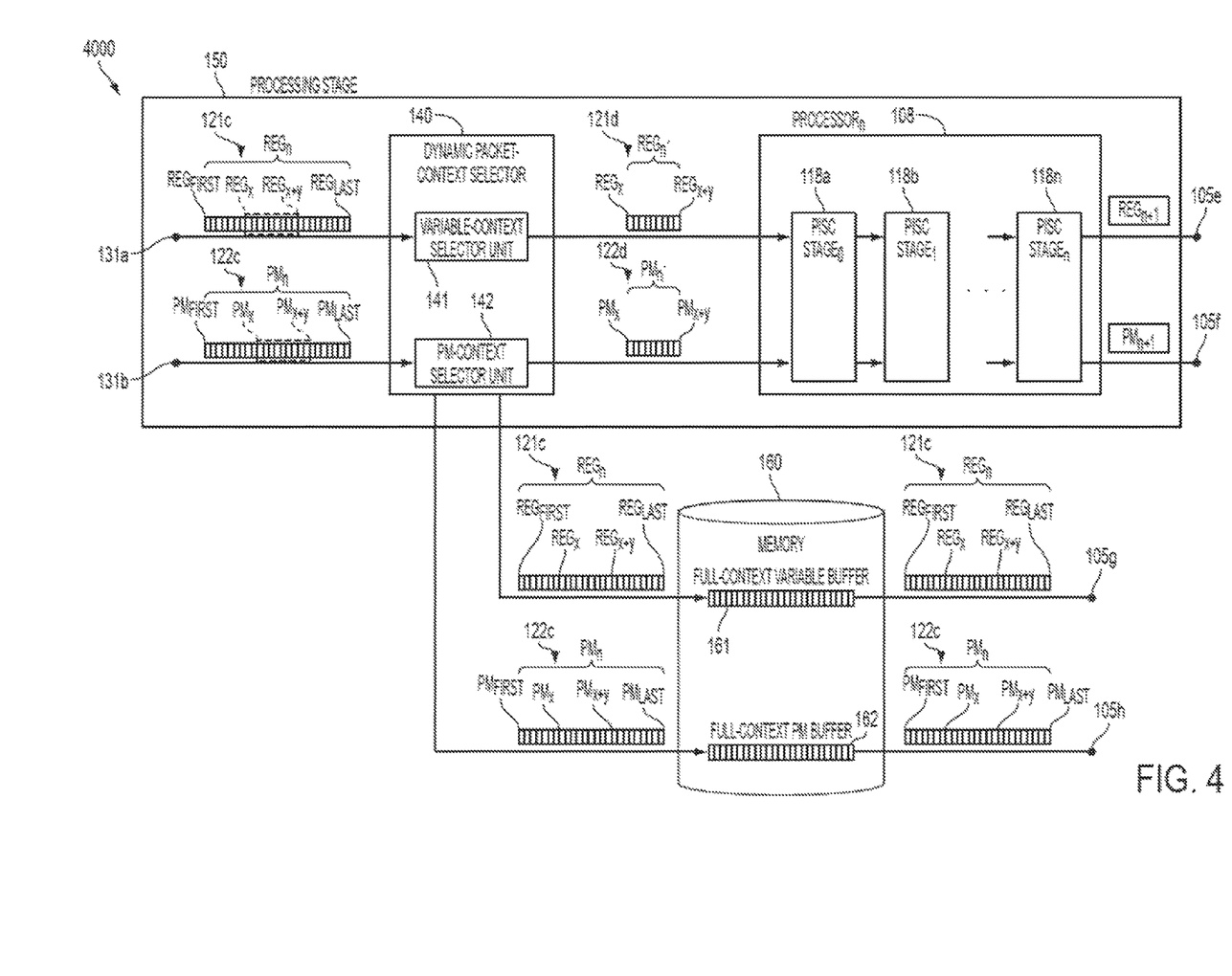
FIG. 4 shows a processing stage of the network processor of FIG. 1 and provides greater detail about the selection of a portion of a packet context according to example embodiments.

FIG. 4 shows a system 4000 including a processing stage 150 of the pipeline 105 of FIG. 1. Considering FIGS. 3 and 4, the merged context 121 of FIG. 3 is received by the dynamic packet context selector 140 of FIG. 4 via communication line 131a and line 131b.

FIG. 4 illustrates that the merged context 121 of FIG. 3 includes full REG context 121c and full PM context 122c.

Full REG context 121c is illustrated as having bits $REG_{first}$, $REG_x$, $REG_{x+y}$, and $REG_{last}$. Full PM context 122c is illustrated as having $PM_{first}$, $PM_x$, $PM_{x+y}$, and $PM_{last}$. The locations of $REG_x$, $REG_{x+y}$ and $PM_x$, $PM_{x+y}$ are dynamically selected by the dynamic packet context selector 140.

As illustrated by FIG. 4, the variable-context selector 141 of the dynamic packet context selector 140 selects a partial REG context 121d from full REG context 121c, and the PM context selector 142 of the dynamic packet context selector 140 selects a partial PM context 122d from the full PM context 122c. According to an example embodiment, the full REG-context 121c travels with the full PM-context 122c, and the values of the full REG-context 121c are merged with resources from table look-up operations, as described above with respect to FIG. 1.

The dynamic packet context selector 140 also transmits the full REG context 121c and full PM context 122c to the packet context FIFO buffer 160.

According to example embodiments, the full REG-context 121c is transmitted from the dynamic packet context selector 140 to the full-context variable buffer 161, and the full PM context 122c is transmitted from the dynamic packet context selector 140 to the full-context PM buffer 162. The full-context variable buffer 161 and full-context PM buffer 162 respectively store the full REG-context 121c and full PM-context 122c while the partial REG-context 121d and partial PM-context 122d are processed at the processor 108.

Figure 5:
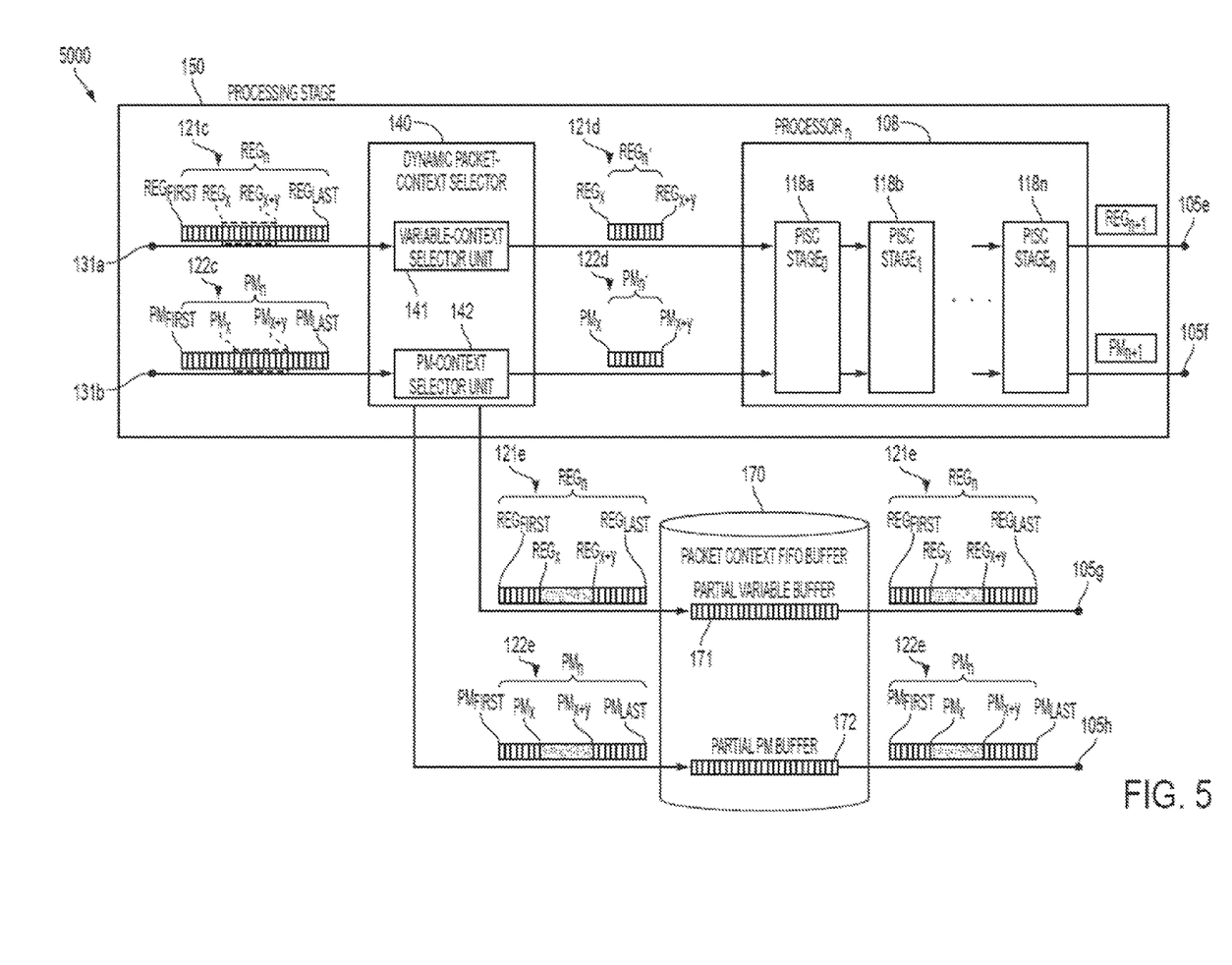
FIG. 5 shows a processing stage of the network processor of FIG. 1 according to example embodiments.

FIG. 5 illustrates an example embodiment wherein the packet context FIFO buffer 170 does not store the full context, as in FIGS. 3-4, but instead only stores a portion of the context which is not transmitted to the processor 108.

Full REG context 121c is illustrated as having bits $REG_{first}$, $REG_x$, $REG_{x+y}$ and $REG_{last}$. Full PM context 122c is illustrated as having $PM_{first}$, $PM_x$, $PM_{x+y}$ and $PM_{last}$. The locations of $REG_x$, $REG_{x+y}$ and $PM_x$, $PM_{x+y}$ are dynamically selected by the dynamic packet context selector 140.

As illustrated by FIG. 5, the variable-context selector 141 of the dynamic packet context selector 140 selects a partial REG context 121d from full REG context 121c, and the PM context selector 142 of the dynamic packet context selector 140 selects a partial PM context 122d from the full PM context 122c.

The dynamic packet context selector 140 also transmits a portion 121e of the full REG context 121c and also transmits a portion 122e of the full PM context 122c to the partial variable buffer 171 and partial PM buffer of the packet context FIFO buffer 170 respectively. The portion 121e is a portion of the full REG-context 121c that was not transmitted to the processor 108. The portion 122e is a portion of the full PM-context 122c that was not transmitted to the processor 108.

The partial variable buffer 171 and the partial PM buffer 172 respectively store the portion 121e and 122e while the partial REG-context 121d and partial PM-context 122d are processed at the processor 108.

FIG. 6 shows an alternative architecture as an example embodiment. In FIG. 6 there is shown system 6000 including network 100, packet 101, a network processor 600, and destination 201.

The destination 201 is a forwarding location to which the packet 101 is forwarded by the network processor 600. The system 6000 performs a set of processing operations to the packet 101.

The network processor 600 includes an ingress port 106 and an egress port 110. The network processor also includes a sea of processors 601. For the sake of illustration, only programmable processors 608a, 608b, 608c, and 608d are illustrated in this figure; however, the sea of processors 601 includes a plurality of other processors according to example embodiments.

According to an example embodiment, each of the programmable processors 608a, 608b, 608c, and 608d is communicatively connected to each other such that each processors performs at least one subset of a set of network processes to the packet 101. The order in which each of the programmable processors 608a, 608b, 608c, and 608d is configurable and is either predetermined or determined in sync with the processing operations of each respective programmable processor.

According to example embodiments, ones of the programmable processors 608a, 608b, 608c, and 608d pass processing results and indications for more processing to any available programmable processor or a predetermined programmable processor.

The packet 101 received by the ingress port 106 is processed along with a packet context, such as full context 191, which includes a full REG context 191a and a full PM context 191b. The full REG context 191a includes values of general purpose registers where variables have been prepared for look-up operations, results of look-up operations, results of analyses, or temporary variables stored by processor cores. The full REG context 191a contains hardware-specific and process-specific registers such as a source queue, a destination queue, ALU flags and instruction pointers. The full PM context 191b includes a location that indicates where a part of a packet header is stored and is to be parsed and forwarded when the packet 101 exits the network processor 600.

According to example embodiments, the ingress port 106, egress port 110, and sea of processors 601 is communicatively connected to the memory 180 such that data of the full context 191 which is not processed by a respective programmable processor 608a, 608b, 608c, or 608d at a given time is stored therein. Each of the programmable processors 608a, 608b, 608c, and 608d receives only a portion of the packet context that will be processed at that respective programmable processor during a respective clock cycle.

The ingress port 106 is configured to transmit the full context 191 to the sea of processors 601. The programmable processors 608a, 608b, 608c, and 608d respectively perform a subset of packet processing operations with a respective subset of the full context 191.

While each respective subset of the full context 191 is processed, either a remaining portion of the full context 191 or the full context 191 is stored in the memory 180 which includes REG buffers 181 and PM buffers 182 according to example embodiments.

The programmable processors 608*a*, 608*b*, 608*c*, and 608*d* are also respectively capable of merging a result of the processing of the respective subset of packet processing operations with the full context 191. The programmable processors 608*a*, 608*b*, 608*c*, and 608*d* are also respectively capable of transmitting either a portion of the full context 191 or a susbset of the full context 191 to another one of the programmable processors, such that each programmable processor processes only a portion of the full context 191 while either a remaining portion of the full context 191 or the full context 191 is stored in the memory 180.

The sea of processors 601 outputs a result 199 of processing the full context 191 for the packet 101. The result indicates a set of network processing operations that have been performed upon the full context 191 for the packet 101, such as when a destination is determined, stripping of the headers is completed, tunnel termination is performed, security and time stamping are applied, or some other policy is applied. The packet 102 is forwarded to a destination 201 as indicated by the result 199.

Although the inventive concept has been described above with respect to the various example embodiments, it is noted that there can be a variety of permutations and modifications of the described features by those who are familiar with this field, without departing from the technical ideas and scope of the features, which shall be defined by the appended claims.

Further, while this specification contains many features, the features should not all be construed as limitations on the scope of the disclosure or the appended claims. Certain features described in the context of separate embodiments can also be implemented in combination. Conversely, various features described in the context of a single embodiment can also be implemented in multiple embodiments separately or in any suitable sub-combination.

Although the drawings describe operations in a specific order and/or show specific arrangements of components, one should not interpret that such specific order and/or arrangements are limited thereto, or that all the operations performed and the components disclosed are needed to obtain a desired result. Accordingly, other implementations are within the scope of the following claims.

What is claimed is:

1. A network processing device comprising:
   a plurality of programmable processors coupled together in series to perform a set of packet processing operations to process a packet received by the network processing device, and
   ones of the programmable processors configured to sequentially perform a respective subset of the set of packet processing operations with a respective portion of a packet context such that ones of the programmable processors receives a portion of the packet context, wherein the received portion is less than a full packet context for performing the packet processing operations, the portion of a packet context being dimensioned to perform the respective subset of the packet processing operations.

2. The network processing device according to claim 1, further comprising a context selector unit preceding at least one of the programmable processors, the selector being configured to select the respective portion, that is less than the packet context,
   the context selector unit being further configured to select a respective portion comprising a set of packet header bits of the packet, information about the packet, a state of processing of the packet, and other variables depending upon the respective subset of the packet processing operations at the at least one programmable processor preceded by the selector.

3. The network processing device according to claim 2, further comprising a buffer configured to store a full portion of the packet context while the respective portion of the packet context, selected by the context selector unit, is processed at the respective programmable processor.

4. The network processing device according to claim 3, further comprising a context merger unit configured to receive the full portion of the packet context, from the buffer, and to merge the full portion of the packet context with a result of the processing of the respective portion of the packet context processed by the respective programmable processor into a merged packet context.

5. The network processing device according to claim 4, further comprising a downstream context selector unit preceding a downstream programmable processor, the downstream context selector unit being configured to select a respective portion of the merged packet context, that is less than the merged packet context, for the downstream programmable processor, and
   the downstream programmable processor is configured to process the respective portion of the merged packet context which is dimensioned corresponding to the respective subset of the set of packet processing operations of which the downstream programmable processor is configured to perform.

6. The network processing device according to claim 5, further comprising a downstream buffer storing a full portion of the merged packet context while the respective portion of the merged packet context, selected by the downstream selector, is processed at the downstream programmable processor.

7. The network processing device according to claim 6, further comprising a downstream context merger unit, downstream to the downstream programmable processor, configured to receive the merged packet context from the downstream buffer and to merge the full portion of merged packet context with a result of the processing of the portion of the merged packet context, processed by the downstream programmable processor.

8. A packet processing method comprising:
   performing, by a plurality of programmable processors coupled together in series, a set of packet processing operations to process a received packet such that ones of the programmable processors sequentially performs a respective subset of the set of packet processing operations each with a respective portion of a packet context received by the programmable processors, including programming code specific for the respective subset of the set of packet processing operations, wherein the received portion of the packet context is less than a full packet context.

9. The packet processing method according to claim 8, further comprising selecting the respective portion, that is less than the full packet context, such that the respective portion comprises a set of bits of the received packet header, information about the received packet, a state of processing of the received packet, and other variables depending upon the respective subset of the packet processing operation.

10. The packet processing method according to claim 9, further comprising storing a full portion of the packet context while the respective portion of the packet context is processed.

11. The packet processing method according to claim 10, further comprising merging the full portion of the packet context with a result of the processing of the respective portion of the packet context into a merged packet context.

12. The packet processing method according to claim 11, further comprising selecting a portion of the merged packet context, that is less than the merged packet context, corresponding to the respective subset of the packet processing operations for processing the portion of the merged packet context.

13. The packet processing method according to claim 12, further comprising storing a full portion of the merged packet context while the respective portion of the merged packet context is processed.

14. The packet processing method according to claim 13, further comprising merging the full portion of the merged packet context with a result of the processing of the portion of the merged packet context.

15. A network processing device comprising:
a plurality of programmable processors coupled together in series to perform a set of packet processing operations to process a packet received by the network processing device, ones of the programmable processors being configured to sequentially perform a respective subset of the set of packet processing operations with a respective portion of a packet context received by the programmable processors, the received portion of a packet context being less than a full packet context for performing the packet processing operations, the portion of a packet context being dimensioned to perform the respective subset of the packet processing operations, and the respective portion of the packet context corresponding to the respective subset of the set of packet processing operations; and
a buffer corresponding to one of the programmable processors, the buffer configured to store a portion of the packet context which remains after the respective portion of the packet context is dimensioned.

16. The network processing device according to claim 15, further comprising a context selector unit preceding at least one of the programmable processors, the selector being configured to select the respective portion, that is less than the packet context,
the context selector unit being further configured to select a respective portion comprising a set of packet header bits of the packet, information about the packet, a state of processing of the packet, and other variables depending upon the respective subset of the packet processing operations at the at least one programmable processor preceded by the selector.

17. The network processing device according to claim 16, further comprising context merger unit configured to receive the portion of the packet context, from a respective buffer, and to merge the portion of the packet context with a result of the processing of the respective portion of the packet context processed by the respective programmable processor into a merged packet context.

18. The network processing device according to claim 17, further comprising a downstream context selector unit preceding a downstream programmable processor, the downstream context selector being configured to select a respective portion of the merged packet context, that is less than the merged packet context, for the downstream programmable processor, and
the downstream programmable processor is configured to process the respective portion of the merged packet context which is dimensioned corresponding to the respective subset of the set of packet processing operations of which the downstream programmable processor is configured to perform.

19. The network processing device according to claim 18, further comprising a downstream buffer configured to store a portion of the merged packet context, which remains after the respective portion of the merged packet context is dimensioned, while the respective portion of the merged packet context, selected by the downstream selector, is processed at the downstream programmable processor.

20. The network processing device according to claim 19, further comprising a downstream context merger unit, downstream to the downstream programmable processor, configured to receive the portion of the merged packet context from the downstream buffer and to merge the portion of merged packet context with a result of the processing by the downstream programmable processor.

* * * * *